United States Patent [19]

Spiel et al.

[11] Patent Number: 4,711,425
[45] Date of Patent: Dec. 8, 1987

[54] ROTARY MOLDING SYSTEM

[75] Inventors: Albert Spiel, Yonkers, N.Y.; James Roe, Wayne; Henry C. Spanier, West Milford, both of N.J.

[73] Assignee: Nabisco Brands, Inc., Parsippany, N.J.

[21] Appl. No.: 898,187

[22] Filed: Aug. 20, 1986

Related U.S. Application Data

[62] Division of Ser. No. 578,040, Feb. 8, 1984, Pat. No. 4,634,597.

[51] Int. Cl.[4] .............................................. B29C 33/42
[52] U.S. Cl. ..................................... 249/117; 249/122; 249/137; 425/434; 426/512; D1/101; D1/104; D1/106; D1/122
[58] Field of Search ...................... 249/117, 122, 137; 425/425, 434, 435; 426/512, 514, 558, 104, 635, 92, 112, 283, 549, 94, 614; D1/101–106, 122

[56] References Cited

U.S. PATENT DOCUMENTS

| | | | |
|---|---|---|---|
| 35,478 | 12/1901 | Wagandt | D1/106 X |
| D. 254,336 | 3/1980 | Miller et al. | D1/106 |
| D. 254,337 | 3/1980 | Miller et al. | D1/106 |
| D. 254,338 | 3/1980 | Miller et al. | D1/106 |
| D. 254,339 | 3/1980 | Miller et al. | D1/106 |
| 2,097,356 | 10/1937 | Truesdale | 249/122 |
| 3,510,315 | 5/1970 | Hawley | 426/614 X |
| 3,689,280 | 9/1972 | Werner | 426/512 X |
| 3,808,341 | 4/1974 | Rongey et al. | 426/92 |
| 3,851,571 | 12/1974 | Nichols | 426/112 X |
| 3,899,607 | 8/1975 | Miller et al. | 426/104 X |
| 3,916,029 | 10/1975 | Hildebolt | 426/94 |
| 3,941,892 | 3/1976 | Glasser et al. | D1/106 X |
| 3,974,296 | 9/1977 | Burkwall | 426/614 X |
| 4,001,449 | 1/1977 | Reardanz et al. | 426/332 |
| 4,009,859 | 3/1977 | Bangert | 249/122 |
| 4,032,665 | 6/1977 | Miller et al. | 426/104 |
| 4,046,922 | 9/1977 | Burkwall, Jr. | 426/104 |
| 4,161,548 | 7/1979 | Warren | 426/614 X |
| 4,162,333 | 7/1979 | Nelson et al. | 426/283 |
| 4,362,761 | 12/1982 | Chang et al. | 426/657 |
| 4,426,400 | 1/1984 | Newlin et al. | 426/614 |
| 4,454,163 | 6/1984 | Gellman et al. | 426/549 |
| 4,546,001 | 10/1985 | Gellman et al. | 426/549 |
| 4,551,343 | 11/1985 | Gellman et al. | 426/549 |

Primary Examiner—Richard L. Chiesa
Attorney, Agent, or Firm—Richard Kornutik

[57] ABSTRACT

A mold for use in a rotary molder in molding the base or egg white portion of a molded product simulating a section of hard boiled egg includes a curved plate adapted for attachment to the rotary molder, the curved plate containing at least one depression on one side to receive the dough or other moldable composition. Each depression in the plate contains a raised portion having a planar surface of circular parameter adapted to form an impression in dough which is received in the depressions of the curved plate. Each raised planar surface within the depression in the plates includes raised ridges adapted to form corresponding grooves in the dough which is received in the depressions which facilitate the baking in situ of a filling or second layer injected into the depression formed in the molded dough pieces.

5 Claims, 5 Drawing Figures

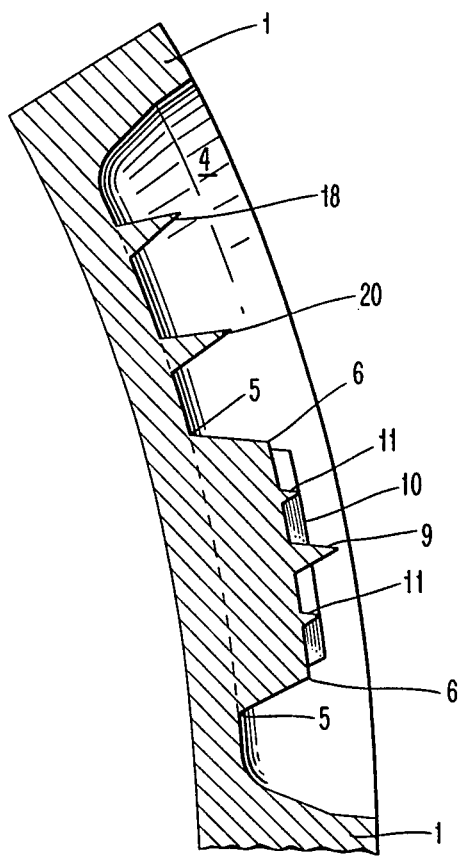
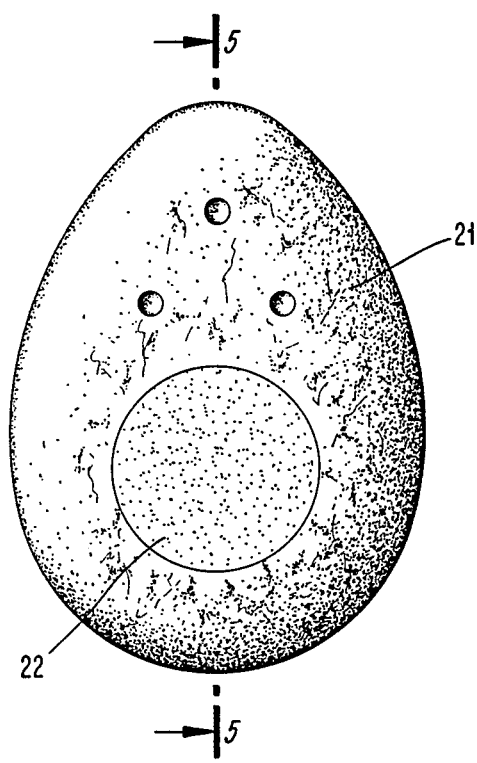
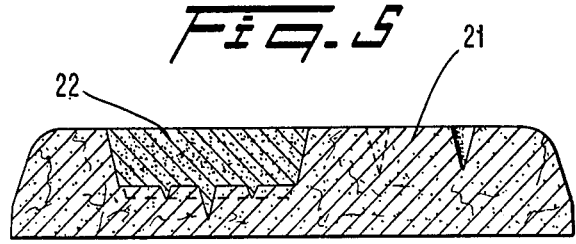

ROTARY MOLDING SYSTEM

This is a divisional of application Ser. No. 578,040, filed on Feb. 8, 1984, now U.S. Pat. No. 4,634,597.

BACKGROUND OF THE INVENTION

1. Field of the Invention

This invention relates to treats for pets. In particular, the present invention is directed to a pet treat which incorporates a simulated appearance, flavor and aroma of cooked eggs, with a meat or meat by-products portion.

2. Description of the Prior Art

It is well-known that certain pets, such as dogs and cats, crave eggs. The incorporation of eggs or an egg flavor component into pet food is also well-known as exemplified by the following U.S. Patents.

U.S. Pat. No. 3,808,341 to Rongey teaches a pet food product having the appearance, flavor and aroma of cooked eggs. An egg base coating encases a less palatable core to mask its taste and appearance. The core is generally formed of materials, such as starch containing cereal and ground meat or fish. This product is not used as a treat, but instead is employed as a meal for pets.

U.S. Pat. No. 4,046,922 to Burkwall, Jr., teaches a cooked pet food product which simulates a natural fried egg and has the form of a rounded disk with a white outer portion and an inner yellow portion. It is produced by coextrusion and contains 20% to 40% by weight moisture.

U.S. Pat. No. 3,916,029 to Hildebolt, teaches a pet food containing a semi-moist inner matrix including a small percentage of whole eggs within an in situ baked outer pastry shell. The inner portion is precooked, ground up and coextruded with the outer portion.

U.S. Pat. Nos. 3,899,607 and 4,032,665, both assigned to Ralston Purina Co., teach simulated bone pet foods which are formed by depressing the material in the shape of a rounded bone cross-section with hollow interior followed by stuffing brownish, farinaceous material into the hollow to resemble bone marrow. The claimed process requires shaping the dough at 100° to 220° F. wherein a simulated bone having a shear value of not less than 250 lbs. per square inch results.

None of these prior art references teach the production of a pet treat by depositing a yolk portion containing egg protein onto a base portion containing meat or meat by-products and simultaneously baking both portions to bond them into a hard biscuit.

SUMMARY OF THE INVENTION

In the present invention both the base portion and the egg yolk portion are integrated into a single product and are baked which causes adhesion of the egg yolk portion to the base portion. The base portion is formed with an indentation on one surface. The yolk portion is applied in fluid form by extruding or depositing the yolk portion into the indented portion. Both the egg yolk portion and the base portion are hard. Because the yolk portion is hard, solid fats do not leach or bleed after baking. Baking the product with low heat is essential because high temperature heat could prematurely set the product before sufficient bonding has occurred.

In order for the egg yolk portion to be extrudable, it must have sufficiently low viscosity. Sugar provides the necessary viscosity and aids in uniform spreading of the filling to obtain a final egg treat which is somewhat planar. The sugar to water ratio is important because the sugar helps bind the yolk portion of the egg base portion and because the sugar to water ratio affects the extrudability and the viscosity of the egg yolk portion. The sugar content is between about 5% to about 20%. A proportion higher than 20% wherein too much sugar exists causes browning. A proportion lower than about 5% causes poor binding between the yolk and base portion due to the lack of sugar, and may cause a short shelf life due to excessive water. Because the egg white portion is desired to be white, use of most sugars is impractical. For example, if dextrose or fructose is employed, such sugars cause browning upon baking. Corn syrup does not produce sufficiently low viscosity. Accordingly, only sucrose produces the desired viscosity and prevents browning of the egg white portion.

Further details and advantages of the present invention appear from the following description of a preferred embodiment shown schematically in the drawings.

BRIEF DESCRIPTION OF THE DRAWINGS

FIG. 3 is a view in section taken along line 2—2 of FIG. 1;

FIG. 4 is a top elevational view of an egg treat product according to the present invention;

FIG. 5 is a side section view taken along line 5—5 of FIG. 4.

DESCRIPTION OF THE PREFERRED EMBODIMENTS

Figure 1:
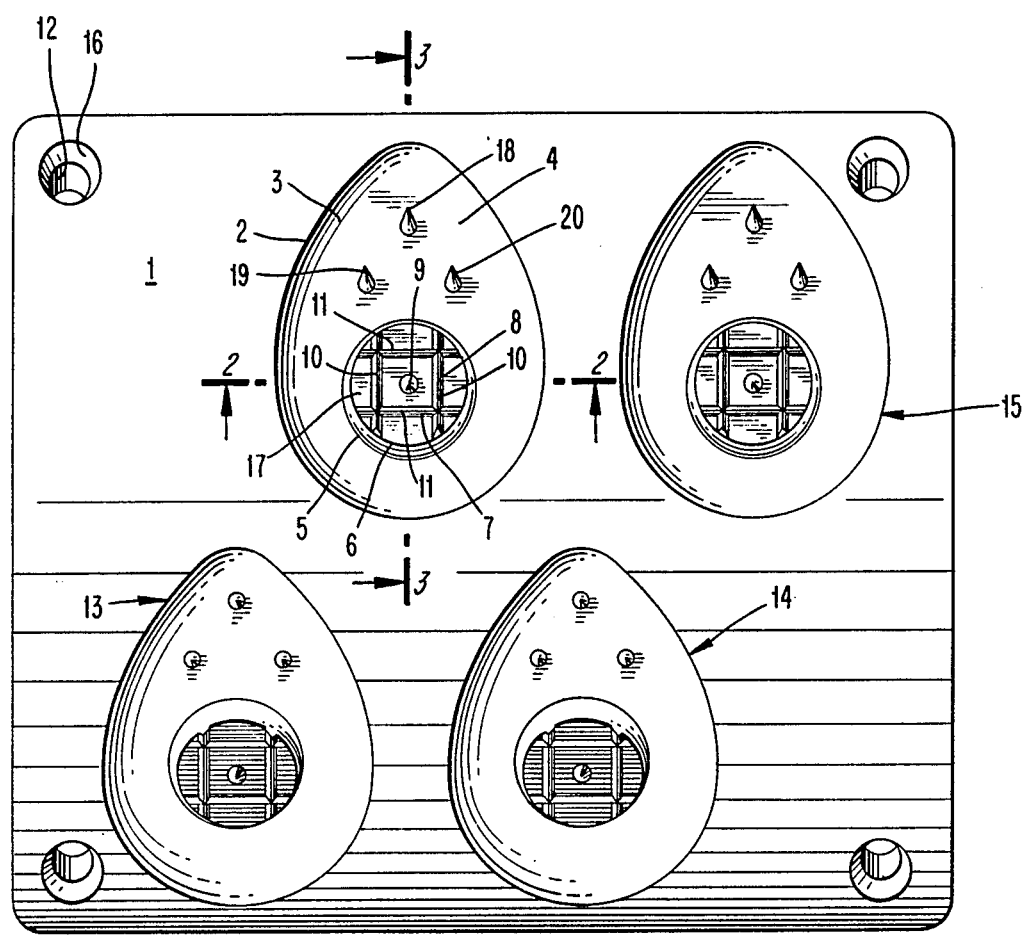
FIG. 1 is a top elevational view of a mold according to the invention.

The dry, hard pet treat of the present invention comprises two discrete portions shaped similarly to the cross-section of a hard-boiled egg wherein a yellow yolk portion 22 is surrounded by a bone white or light brown meat and/or meat by-product portion which is referred to hereunder as the egg white portion 21. The pet treats are microbiologically stable and can be stored without refrigeration or special packaging for periods up to at least 12 months, up to about 18 months. The preferred shape is that of a cross-section of a hard-boiled egg but other shapes such as round, animal-shaped, or steak-like (steak and eggs) are also contemplated and are within the scope of the invention. In a preferred embodiment, thickness of approximately ½ inch is used and is typical for this and other pet treats.

The long shelf life is attributable to a moisture content of less than about 30% and a water activity in a range well-recognized and conventionally known for stability, usually in the range of, or below, 0.65–0.70 (water activity being defined as the ratio of partial pressure of $H_2O$ in the product, to the partial pressure of $H_2O$ at standard laboratory conditions). The low water activity prevents the flow of water upon baking. The high viscosity of the unbaked product (i.e., a consistency similar to peanut butter) has the added desired effect of preventing bleeding because water or other liquids do not work into any capillary cracks. Higher moisture and water activity above that which is set forth in the present invention could cause bleeding or smearing of the yolk into the meat-containing, or meat-by-product containing, surrounding area during extrusion, cutting, curing, and baking of the compositions employed in the present invention. Hardness reduction is caused by the formation of steam pockets which convert into air pockets when the pet treat is baked.

The following description uses the word "meal". The meal may be any one of the following plant or animal meals including, but not limited to, soybean meal, wheat meal, meat and bone meal, fish meal, poultry meal, oatmeal, rye meal, corn meal, rice meal, and barley meal.

The stability of the pet treat is achieved through a low water activity of the range well recognized for stability, which is generally in the range of 0.65–0.70 or less. This low water activity is achieved by dehydration or the use of humectants known to those skilled in the art such as glycerin, propylene glycol, salt, corn syrup, sugar or the like.

The meat and/or meat by-product containing portion of the present invention, i.e., the egg white portion, preferably contains from about 40 to 50% by weight flour; about 10 to 15% meal; about 2.5 to 3.5% flavoring, vitamin and mineral preblends and preservatives, 10 to 15% egg solids; and 25 to 30% water. The preferred yolk filling of the present invention contains about 15 to 25% flour; 4 to 8% meal; 3 to 5% flavoring, mineral and vitamin premix; coloring agents and preservatives; 12 to 18% sugar; 15 to 20% egg solids; and 30 to 40% water. The meat or meat by-product-containing portion comprises 90 to 95% by weight of the entire egg treat (shown in FIGS. 4,5) before baking. The baked weight of the pet treat is approximately 70% to 80% of the weight of the egg treat before baking.

The dry ingredients can be blended together in any typical mixer such as a ribbon blender, rotary blade mixer or Hobart type mixer until a substantially homogeneous composition is achieved. The water is then added to produce a stiff dough which is extruded through a die to form the base portion. All mixing can be performed at 20–100 rpm of the blades. The dry blending is typically at room temperature and atmospheric pressure for a period of about 3 to 10 minutes, but any amount of time may be used to blend the ingredients. The water may be hot tap water having a temperature of approximately 90° to 150 F. Nonetheless, any lukewarm, to very hot, to boiling water may be used if such is available. After the hot water has been added, additional mixing of 3 to 5 minutes is necessary to form the stiff dough, although this can vary greatly depending upon how the dough is mixed. Generally, the egg white portion may be extruded and an indentation is formed on the top surface thereof. This is not the preferred method of making the egg white portion, however, since the extruded product must be sliced, as by a wire slicer. Slicing causes warping, bending, and other types of distortion of the egg white portion, which is not rectified by settling of the egg white portion since the dough of the egg white portion is too viscous to settle flat without application of an additional external force. Warped egg white portions are not as attractive as flat egg white portions, nor are they as amenable to addition of the yolk portion in an automated production process. However, in a preferred method of forming, the egg white portion dough can be rolled flat and cut into an egg shape by a rotary cutter as described hereunder.

In preparing the yolk portion 22, the dry ingredients are generally blended for approximately the same length of time as the egg white portion dry ingredients in order to achieve substantial uniformity. Again, however, any amount of time may be used for blending, depending on the mixer, the speed of operation, and the amount and quality of the materials to be blended. Then cold tap water of about 40° F. to 80° F. is added and additional mixing for about 3 to 5 minutes yields a peanut butter type consistency of product having a yellow coloring. Any available cold tap water will suffice. This filling is placed into an ejector or extruder and forced outwardly through a die or nozzle into the indented portion of the base of the pet treat.

The pet treats are baked, to achieve a shelf stable product without the need for a moisture barrier protector. Typical baking temperatures are from about 200° to 600° F. for about 8 to 25 minutes. Typical drying conditions are from about 200° F. to about 325° F. for approximately 12 to 25 minutes in a forced air dryer. On a weight basis, the final product is approximately 70% to 80% of the weight of the prebaked product. This results from evaporation of the water during baking.

FIG. 1 is a top elevational view of a mold element showing a mold element 1 for producing egg white portions 21 using a conventional rotary cutter (not shown). In a rotary cutter, a large cylindrical support, having molds fixed thereto, is rotated in place in contact with a moving flat sheet of dough. A support is under the moving dough. Pressure between the molds and the dough support forces the dough to fill the mold.

Four egg white mold patterns 2,13,14,15 are formed in the mold element 1. As shown in section in FIGS. 2 and 3, the pattern shown is formed in depressions 4 in the mold surface. Two pairs of intersecting ridges 10, 11 are raised above an elevated die surface 7. The raised die surface 7 is used to form an indentation in the egg white dough 21 for the egg yolk portion 22 (both shown in FIGS. 4 and 5). The raised ridges 10, 11 are used to form corresponding depressions in the egg white dough 21. The yolk portion 22, when injected into the depression formed by surface 17 in the egg white portion 21, spreads into the depressions formed by ridges 10, 11 of the mold element so as to increase the strength of the bond between the egg yolk portion 22 and the egg white portion 21. This advantageously improves the quality of the final product to the consumer.

Projections 9, 18, 19, 20 are formed above the depression 4 in each mold. Each projection is spike-like. None of the projections extend above the level of the top of the surrounding body 1. Projection 9 extends above the flat raised surface 17 to a point close to the top of the surrounding body 1. The projection 9, although shown as centrally located on the raised surface 17, may be located anywhere else on the raised surface 17 or could be omitted entirely. Projections 18–20 extend above the level 5 of the raised portion 17, and are spaced away from the raised portion 17 along the bottom surface of the depression 4.

The raised surface 17 is bounded by an edge 6. The lower portion or base of edge 6 of surface 17 is designated by the numeral 5 in FIGS. 1–3.

The base portions of raised ridges 11 are designated in the drawings as base 7. The base portions of raised ridges 10 are designated as base 8. The outermost edge of the depression 4 is denoted by juncture 2 which is the intersection of the generally smooth curve of the top surface of the body 1 with the upwardly extending walls of the depression 4. The base of the depression wall is indicated in FIG. 1 as the numeral 3; the upwardly sloping sidewall between sidewall base 3 and junction 2 is angled outward to permit ease of removal of dough 21 from depression 4 during operation of the rotary cutter. Projections 9, 18–20 similarly are provided for aiding in the smooth removal of dough 21 from the respective mold depression 4. Mounting holes 12 having bevelled edges 16 are shown in FIG. 1, and receive fastening elements for attaching the body 1 to the rotating cutter.

Figure 2:
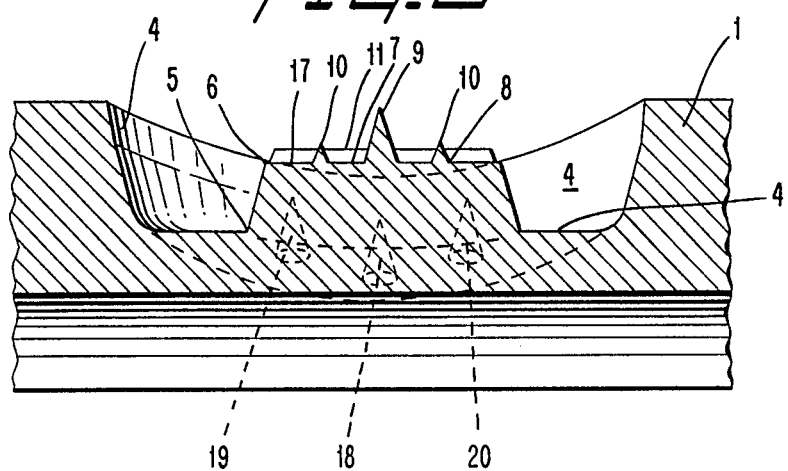
FIG. 2 is a side sectional view taken along line 2—2 of FIG. 1.

FIG. 2 shows a side cross-sectional view of the mold taken along line 2—2 in FIG. 1. The elements shown in FIG. 2 have been discussed in the above with reference to FIG. 1. The raised intersecting ridges 10 and 11 are shown in FIG. 2 with ridge 10 being slightly higher than ridge 11. However, the relative heights may be equal or may be reversed, without departing from the scope of the present invention. Additional ridges may also be provided at any location on the raised surface 17, and may be at any desired angle to ridges 10,11. Other shapes may be used instead of linear ridges, including circular, S-shaped, angled, dotted, dashed, or even flat-topped raised surfaces of planar extent less than that of the raised surface 17.

FIG. 3 shows a sectional view taken along line 3—3 of FIG. 1. The elements shown are as discussed in the above. FIG. 3 illustrates the curved shape of the mold, suitable for mounting upon a rotating molder support cylinder surface (not shown).

FIG. 4 is a top elevational view of the egg treat product of the present invention. The egg white portion 21 has the overall shape of a longitudinal cross-section of an egg. The egg yolk portion 22 rests in a depression in the egg white portion 21 formed by operation of the rotary molder on the dough 21, as discussed in the above.

FIG. 5 is a side view in section taken along line 5—5 in FIG. 4. FIG. 5 clearly shows the depression formed in the egg white portion 21 in which the egg yolk portion 22 is received.

Typically 5 to 10% of the total weight of the egg treat base 21 and egg yolk portion filling 22 is the filling portion before baking. The indentation on the base portion before the injection of the yolk portion includes in a preferred embodiment a cross hatching pattern at the bottom of the indentation. The cross hatching pattern is formed by the grooves 10,11 of the mold. Upon heating the yolk filling flows into the grooves thereby causing the yolk filling to lock itself into the base portion such that it is strongly bonded to the base portion.

Sugar, tallow, and water give the yolk portion fluidity particularly when these ingredients are mixed with high shear mixing devices such as an Eppenbach ® or Oakes ® mixer. These mixers quickly homogenize the ingredients yielding a consistency of peanut butter, which is pumpable and ejectable. The low temperature setting and low residence time in the baking oven prevents the filling from prematurely setting before it has time to flow and fill the entire indentation. Furthermore, temperature sufficient to cause premature setting would also prevent the filling from interlocking with the base portion, including the grooves at the bottom of the indentation. The texture of the yolk can be varied from the texture of the base portion by introducing air into the yolk filling. Likewise, the base and filling can be of different colors, different sweetness levels, or any other properties, thus permitting the possible production of many varieties of products.

The flour is generally a blend of a hard flour and a medium flour in order to attain a stiff, but not elastic, dough for the egg treat base portion. The meal may be any one of the following plant or animal meals including, but not limited to, soybean meal, wheat meal, meat and bone meal, fish meal, poultry meal, oatmeal, rye meal, corn meal, rice meal, and barley meal.

The various flavorings can be either liquid or dry type flavorings including powdered milk, salt, citric acid, calcium carbonate, MYF (which stands for Molasses Yeast Fermented solids) flavoring, inedible tallow (stabilized with BHA), ascorbic acid, meat, poultry or fish flavorings, and vegetable flavorings, among others.

The minerals and vitamins generally may comprise any of such minerals as calcium, phosphate, etc. and a conventional commercially available vitamin mix. A dough conditioner is typically sodium metabisulfite to produce a more workable dough, used alone or in combination with preservatives. The egg portion 22 ingredient may be a conventional, commercially available egg solid composing commercially dried eggs or ground hardboiled eggs. The sugar normally employed is a non-reducing sugar such as sucrose sugar. It has been found that fructose and dextrose cause the egg treat to brown when baking when employed in the yolk filling. Corn syrup does not produce sufficiently low viscosity nor binding action necessary to bind the yolk filling portion 22 to the base portion 21. Accordingly, sucrose, which does not brown upon baking to the extent that dextrose and fructose do, is the most practical and economically useful sugar. In the egg yolk portion 22 filling, various coloring agents can be employed such as titanium dioxide, carotenoid, or any other conventional coloring agents. The sucrose sugar is generally a finely ground sugar. A coarser sugar is not desirable, but still could be used, because from a practical standpoint, the quick solubility of the finer sugar shortens the preparation time and would result in lesser production costs. The yolk portion 22 may, if desired, extend substantially above the surface of the base portion 21.

The following examples illustrate the present invention:

EXAMPLE

The egg treat base portion comprises 43.38% flour, 13.23% meal, 2.81% flavoring, 0.41% vitamin and mineral premix, 0.04% preservative, 12.08% egg and 28.5% water. The percentages are all based upon weight and approximately total 100% of the base of the egg treat. All the ingredients, except the water, are mixed at room temperature in a mixer a sufficient time to obtain a uniform mixture. Hot tap water is added to the dry blended mixture and mixing is continued until a uniform mixture is obtained and results in a stiff dough. The base filling is molded into an egg shape by a rotary molder. Dough 21 is molded and an indentation is then made on the upper surface of the dough 21 with grooves 10,11 forming cross hatching being formed in the bottom of the indentation.

The egg treat yolk filling portion comprises 21.41% flour, 5.60% meal, 3.24% flavoring, 0.27% vitamin and mineral premix, 15.55% sugar, 1.11% coloring agents, zero to 0.01% preservative, 16.28% egg solids and 36.53% water. Preservatives are not usually used or needed. These percentages of ingredients are based upon weight and comprise 100% of the filling. All the ingredients, except water, are mixed at room temperature to obtain a uniform mixture. Cold tap water is then added to the dry blend mixture and mixing is continued until a consistent mixture is obtained to form a stiff filling having a peanut butter-like consistency and viscosity. The mixing is accomplished in a high speed Oakes mixer. The yolk filling is then extruded through a band depositor having multiple nozzles into the indentations of the base portion 21 which is discussed in the above. Then the egg treat product is baked at a temperature of about 200° F.–600° F. for about 5–15 minutes. Drying occurs at about 200° F. to 325° F. for about 12–25 minutes, in a forced air dryer including about a 7 minute retention time in the oven. This reduces the weight of the egg product by approximately 25%. The weight reduction is due to loss of moisture; the final product then has a moisture content of approximately 11%.

Although in the preferred embodiment a depression is formed on the egg white portion 21, a raised area could be provided instead. That is, the surface 17 formed on the egg white portion could, in the alternative embodiment, be raised above the remaining areas of the egg portion 21 and still retain their function of assisting in the attachment of the egg yolk portion 22.

The improved treat of the present invention is capable of achieving the above-enumerated advantages and while preferred embodiments of the present invention have been disclosed, it will be understood that it is not limited thereto but may be otherwise embodied within the scope of the following claims.

What is claimed is:

1. A mold for use in a rotary molder, comprising:
   a curved plate adapted for attachment to, and use in, a rotary molder;
   said curved plate having at least one depression formed therein, on one side of said curved plate;
   each of said at least one depression being bounded along said curved plate by a perimeter;
   said perimeter being in the shape of an outline of an egg;
   each said depression having a generally planar surface located entirely within said depression, the planar surface having a generally circular perimeter and being raised above the surrounding area of said depression;
   said planar surface having a plurality of raised ridges thereon, each of said ridges lying entirely within said at least one depression;
   said raised ridges being adapted to form grooves in dough which is received in said at least one depression;
   whereby dough passing beneath a rotary molder having said curved plate attached thereto is received by said at least one depression so as to be shaped thereby in the shape of an outline of an egg having a depression formed in the dough at a location corresponding to the location of a yolk in an egg.

2. A mold as claimed in claim 1, wherein a spike extends from said planar surface;
   said spike lying entirely within said at least one depression;
   whereby release of the dough from the said at least one depression is facilitated.

3. A mold as claimed in claim 2, wherein at least one raised spike extends from the area in said at least one depression surrounding said planar surface;
   whereby release of the dough from the said at least one depression is facilitated.

4. A mold as claimed in claim 3 wherein said raised ridges include at least two intersecting ridges.

5. A mold as claimed in claim 4, wherein said raised ridges include at least two parallel ridges.

* * * * *